US012765479B2

(12) United States Patent
Sugihara et al.

(10) Patent No.: US 12,765,479 B2
(45) Date of Patent: Oct. 20, 2026

(54) PRODUCTION METHOD OF AGRICULTURAL PRODUCTS AND HYDROPONIC PLANTS, AND POWDER AND GRANULAR MATERIAL

(71) Applicant: JAPAN AGARICUS Corporation, Sagamihara (JP)

(72) Inventors: Sunao Sugihara, Yokohama (JP); Isao Hattori, Tohkamachi (JP); Hikoichi Hattori, Tohkamachi (JP); Tomoji Matsubara, Yokohama (JP); Takao Nojima, Atsugi (JP); Minoru Hoshino, Zama (JP)

(73) Assignee: JAPAN AGARICUS Corporation, Sagamihara (JP)

( * ) Notice: Subject to any disclaimer, the term of this patent is extended or adjusted under 35 U.S.C. 154(b) by 0 days.

(21) Appl. No.: 19/091,825

(22) Filed: Mar. 27, 2025

(65) Prior Publication Data

US 2025/0311662 A1 Oct. 9, 2025

(30) Foreign Application Priority Data

Apr. 5, 2024 (JP) ................................ 2024-061621

(51) Int. Cl.
*A01G 24/25* (2018.01)
*A01G 22/22* (2018.01)
*C02F 1/00* (2023.01)

(52) U.S. Cl.
CPC ............ *A01G 24/25* (2018.02); *A01G 22/22* (2018.02); *C02F 1/005* (2013.01)

(58) Field of Classification Search
CPC ........ A01G 24/00; A01G 24/22; A01G 24/25; A01G 22/00; A01G 22/20; A01G 22/22
See application file for complete search history.

(56) References Cited

U.S. PATENT DOCUMENTS

2020/0346943 A1 11/2020 Sugihara et al.

FOREIGN PATENT DOCUMENTS

CN 116439082 A * 7/2023 ............ A01G 22/22
JP 2004-322020 A 11/2004

(Continued)

OTHER PUBLICATIONS

Sugihara et. al., Medicon Medical Sciences vol. 4 Issue 5, published Apr. 3, 2023 (Year: 2023).*

*Primary Examiner* — Magdalena Topolski
*Assistant Examiner* — Edgar Reyes
(74) *Attorney, Agent, or Firm* — Yokoi & Co., U.S.A.; Toshiyuki Yokoi

(57) ABSTRACT

The powder and granular material provided with reducible activity is prepared by immersing in water a powder and granular material to be used as the treated media for providing reducible activity, in which the presumed particles are generated by means of applying high pressure to the water at a level of 147 megapascal, or by bringing the powder and granular material closer to the water provided with reducible activity to thereby transcribe the presumed particles to the powder and granular material so that the powder and granular material provided with reducible activity is prepared. Then, the obtained powder and granular material provided with reducible activity is mixed with the soil in the vegetation fields used for production of agricultural products.

4 Claims, 8 Drawing Sheets

(56) References Cited

FOREIGN PATENT DOCUMENTS

| | | | | | |
|---|---|---|---|---|---|
| JP | 6666528 | B | | 3/2020 | |
| JP | 2022097914 | A | * | 7/2022 | |
| JP | 7159275 | B | | 10/2022 | |
| KR | 20-0406309 | Y | | 1/2006 | |
| KR | 102636621 | B1 | * | 2/2024 | ............ A01G 24/40 |

* cited by examiner

Fig. 5

| | General field | | | Field provided with reducible activity | | | | | |
|---|---|---|---|---|---|---|---|---|---|
| Sampling position | A | B | Average | 1 | 2 | 3 | 4 | 5 | Average |
| Number of stems with rice husks | 20 | 24 | 22 | 20 | 27 | 36 | 23 | 28 | 26.8 |
| Weight of rice husks (g) | 37 | 44 | 40.5 | 52 | 46 | 86 | 46 | 59 | 57.8 |

Fig. 7

[Productive tiller] Number of stems with rice husks Unit: number

| | Control | A | B | C | D | E | F |
|---|---|---|---|---|---|---|---|
| Rice husk charcoal/kg | 0 | 0.5 | 1 | 1.5 | 2 | 2.5 | 3 |
| Data No. 1 | 23 | 18 | 19 | 37 | 24 | 27 | 29 |
| Data No. 2 | 21 | 21 | 19 | 29 | 24 | 25 | 37 |
| Data No. 3 | 24 | 20 | 20 | 20 | 21 | 36 | 24 |
| Data No. 4 | 17 | 24 | 24 | 25 | 27 | 24 | 34 |
| Data No. 5 | 15 | 22 | 24 | 21 | 30 | 33 | 32 |
| Total | 100 | 105 | 106 | 132 | 126 | 145 | 156 |
| Average | 20.00 | 21.00 | 21.20 | 26.40 | 25.20 | 29.00 | 31.20 |
| Ratio to control | | 105% | 106% | 132% | 126% | 145% | 156% |

Fig. 8

[Yields] Weight of rice husks per a rice plant after threshing Unit: gram

| | Control | A | B | C | D | E | F |
|---|---|---|---|---|---|---|---|
| Rice husk charcoal/kg | 0 | 0.5 | 1 | 1.5 | 2 | 2.5 | 3 |
| Data No. 1 | 50 | 47 | 52 | 80 | 62 | 62 | 65 |
| Data No. 2 | 48 | 51 | 48 | 72 | 59 | 56 | 99 |
| Data No. 3 | 50 | 48 | 48 | 53 | 54 | 98 | 61 |
| Data No. 4 | 48 | 53 | 63 | 52 | 69 | 67 | 80 |
| Data No. 5 | 32 | 63 | 60 | 39 | 70 | 66 | 64 |
| Total | 228 | 262 | 271 | 296 | 314 | 349 | 369 |
| Average | 45.60 | 52.40 | 54.20 | 59.20 | 62.80 | 69.80 | 73.80 |
| Ratio to control | | 115% | 119% | 130% | 138% | 153% | 162% |

PRODUCTION METHOD OF AGRICULTURAL PRODUCTS AND HYDROPONIC PLANTS, AND POWDER AND GRANULAR MATERIAL

CROSS-REFERENCE TO RELATED APPLICATIONS

This patent specification is based on Japanese patent application, No. 2024-061621 filed on Apr. 5, 2024 in the Japan Patent Office, the entire contents of which are incorporated by reference herein.

TECHNICAL FIELD

The present invention is related to a production method of agricultural products and hydroponic plants that uses water provided with reducible activity consisting of pico-particle water molecules obtained by subjecting water to high pressure, and a powder and granular material to be used for implementing the production method of agricultural products and hydroponic plants.

BACKGROUND OF THE INVENTION

Activated water or water provided with reducible activity is obtained by activating water consisting of groups of water molecules formed in the cluster state has been already disclosed in Japanese Patent No. 6666528. It was confirmed by means of hydrogen nuclear magnetic resonance that this activated water is formed by releasing the hydrogen bonds of the water molecules by means of high-pressure treatment to form presumed particle known as so-called “pico-particle water” of which water molecules are dispersed with one to another.

It is disclosed in the Japanese Patent No. 7159275 that water with reducible activity consisting of pico-particle water molecules is obtained by either transcribing or printing the presumed particles onto the surface of crystal microspheres according to the process of the presumed particle formation disclosed in the Japanese Patent No. 6666528 and followed by immersing the crystal microspheres in water so that water with reducible activity consisting of pico-particle water molecules is obtained. It has been proved that this water with reducible activity is useful for various purposes such as production of antiseptic and rust-preventing water, antibacterial water, drinking water, cooking water, and food washing water.

Although it is not the directly-related literature, a simple type hydrogen generator, that generates hydrogen by introducing particulate media formed in a powdered state to a cylinder and subsequently enclosing the media in a nonwoven bag is disclosed in the Japanese published patent gazette No. 2004-322020 being the well-known technology. Furthermore, it is also not a literature directly-related to the present invention, but as a well-known technology, the capsules generating alkaline water provided with reducible activity, which contain a cylindrical net thread structure in a hollow cylinder having water flow pores, and magnesium granules are filled in said net thread structure is disclosed in the Korean Utility Model No. 20-406309.

Contrary to the main agricultural countries with a vast amount of arable land, the land owned by an individual farmer in Japan is relatively narrow and yields of the respective crops are accordingly small. Due to this reason, small scale agricultural workers tend to pay attention to the increase of the yields from small cultivated lands, and they are addressing the target for this aims to the selection of efficient crops and improvement of cultivated lands. For the improvement of cultivated lands, selection and development of fertilizers and cultivation techniques, etc. are taken into account, and especially, it is particularly focused on the research and improvement of water itself being essential for cultivation.

As shown in Japanese Patent No. 6666528, the method and the apparatus for obtaining water provided with reducible activity or activated water by generating presumed particle by means of applying high pressure to water is known as a water reforming technology. However, the use of the water provided with reducible activity or the activated water has been limited so far to the medical field, such as increase of the amount of blood oxygen and decreased blood viscosity, antiseptic and antioxidant activity of water, and various rust prevention, but the activity to increase the yields of agricultural crops has not been reported.

Japanese Patent No. 7159275 shows an apparatus formed in a cylindrical shape for generating water provided with reducible activity that can obtain the water provided with reducible activity simply and promptly by embodying the basic idea of Japanese Patent No. 6666528. However, the advantageous use of the obtained water provided with reducible activity itself is directed to the advantageous use as drinking water or cooking water, and further to increase of absorbency through cell membranes after drinking, medical benefits such as increase of blood oxygen amount and decrease of blood viscosity, or antiseptic and antioxidant activity, various rust preventing activity and various drinking and cooking usages, as well as Japanese Patent No. 6666528. However, the use for increasing the yields of agricultural crops is not claimed in the patents as described above.

SUMMARY OF THE INVENTION

It is an object of the present invention to implement such a purpose that the activated water or the water provided with reducible activity disclosed in the Japanese Patent No. 6666528 and the Japanese patent No. 7159275 can be applicable to agricultural field, to device the framework being capable of increasing the yields of agricultural products and to provide the production method of agricultural products that enables increase of the yields thereof, such as grains like rice and wheat, vegetables, etc. cultivated in paddy fields or the other fields.

It is another object of the present invention to promote the growth of hydroponic plants cultivated in a facility, such as a greenhouse or a factory other than outdoor fields, and to provide the production method of hydroponic plants that enables increase of yields thereof.

It is a further object of the present invention to provide the useful powder and granular material to be used for said production method of agricultural products.

It is a still further object of the present invention to provide the useful powder and granular material to be used for said production of hydroponic plants.

(1) According to the present invention, the production method of agricultural products characterized in that the agricultural products are produced by applying the water with reducible activity, in which presumed particle are generated by means of applying high pressure to water at a level of 147 megapascal, to the vegetation soil.

(2) According to the present invention, the production method of the agricultural products is characterized in that the powder and granular material provided with reducible activity is produced by immersing the powder and granular material that functions as a treated media being applied for producing agricultural products to the water, in which the presumed particle are generated by applying high pressure to water at a level of 147 megapascal, and that the powder and granular material provided with reducible activity is mixed to the vegetation soil to cultivate the agricultural products.

(3) According to one embodiment of the present invention, the powder and granular material provided with reducible activity is characterized in that the reducible activity is provided by immersing the untreated powder and granular material being in a state enclosed in a bag to the water in which the presumed particles are generated in the process of the production method as described in (2) above.

(4) According to the other embodiment of the present invention, it is characterized in that the powder and granular material provided with reducible activity used in the production method of the agricultural products described in (2) and (3) above is powdered coal made through a shredding process.

(5) Furthermore, according to the other embodiment of the present invention, it is characterized in that the powder and granular material provided with reducible activity used in the production method of the agricultural products described in (2) and (3) above is rice-husk charcoal produced by carbonizing rice husks.

(6) Furthermore, according to the other embodiment of the present invention, it is characterized in that the quantity of the powder and granular material provided with reducible activity to be introduced into the cultivation soil is set to a range of from 2 kg or more to 4 kg or less per square meter of paddy field, more preferably to a range of from 2.5 kg or more to 4 kg or less.

(7) Furthermore, according to the present invention, the production method for the hydroponic plants characterized by using the water provided with reducible activity, in which the presumed particles are generated by applying high pressure at a level of 147 megapascal to water, for cultivation of hydroponic plants and subsequently either immersing the hydroponic plants in the water provided with reducible activity or spraying the water provided with reducible activity to the hydroponic plants is obtained.

(8) Furthermore, according to the present invention, the powder and granular material provided with reducible activity to be used for production of agricultural products, characterized by comprising the material to which the presumed particle prepared by applying high pressure at a level of 147 megapascal to water are transcribed, can be obtained.

(9) Further, according to an embodiment of the present invention, the material providing reducible activity to the powder and granular material used for production of agricultural products described in (8) above is crushed powdered charcoal.

(10) Further, according to the other embodiment of the present invention, the material providing reducible activity to the powder and granular material used for production of agricultural products describe in (8) above is rice husk charcoal made by carbonizing rice husks.

(11) According to the further embodiment of the present invention, the material providing reducible activity to the powder and granular material used for production of agricultural products is either powdered charcoal or rice husk charcoal being enclosed in a bag.

BRIEF DESCRIPTION OF DRAWINGS

FIG. 5 is a diagram showing the number of the stems shooting from a rice plant and the weight (g) of rice husks, those which are counted respectively for the sampling positions A, B, and 1 through 5 described in FIGS. 4A and 4B, and those averages for the respective sampling positions, when comparing the stems of rice plant collected from the ordinary field described in FIGS. 4A and 4B with the stems of a rice plant collected from the field to which the rice husk charcoal provided with reducible activity is applied.

FIG. 7 is a diagram showing the number of productive tiller of a rice plant in comparison of a rice plant cultivated in a field to which no reducible activity is provided with a rice plant cultivated in a field to which the rice husk charcoal provided with reducible activity according to the present invention is applied.

FIG. 8 is a diagram showing yields (g) of rice plants cultivated in the experimental field mixed with the rice husk charcoal provided with reducible activity in comparison with the yields of rice plants cultivated in the experimental field to which no reducible activity is provided.

DETAILED DESCRIPTION OF THE INVENTION

Now the embodiments of the present invention are explained with referring to the attached drawings.

Firstly, the overview of the presumed particle referred in this invention is explained. A presumed particle is consisted of one proton (H+) and one electron (e−) but it is not constituted with a hydrogen atom. As the characteristic of this particle, it has reducible activity.

Although general water (H2O) is considered to be existed in a structure comprising the aggregation of the molecules. When water is subjected to high pressure at a level of 147 megapascal, the hydrogen bonds of water are released to form a presumed particle consisting of protons (H+) and electrons (e−), thus it becomes so-called "pico-particle water" of which molecular arrangements are caused to be rough. The water obtained as described above is termed in this invention as "water provided with reducible activity" or "water having reducible activity". The water provided with reducible activity (water having reducible activity) does not comprise hydrogen atoms but is consisted of protons (H+) and electrons (e−), and it functions as if it is a particle and irradiates electromagnetic wave at a level of terahertz. In this respect, the water provided with reducible activity may be called as "pico-particle water waves".

Figures 1A, 1B, 1C:
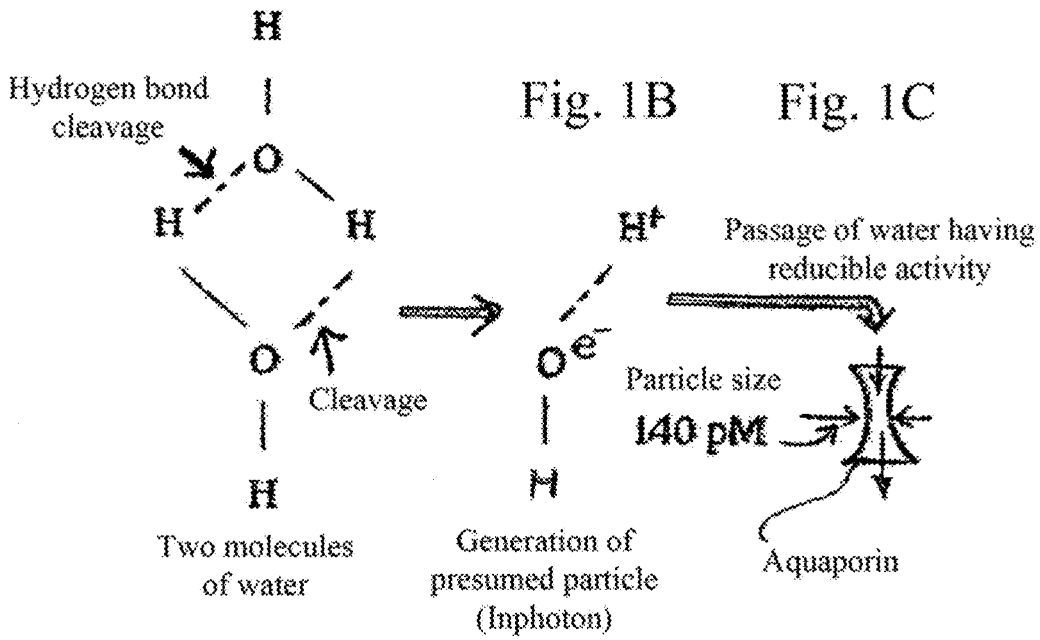
FIGS. 1A to 1C are schematic diagrams showing the embodiment for preparing the water provided with reducible activity to be used in an example of the present invention, wherein generation of the presumed particle (FIG. 1A) following to breaking the hydrogen bond of two molecules of water (FIG. 1B) and a state that water in which the presumed particles are generated is passing through aquaporin are schematically shown.

FIG. 1A schematically denotes two molecules of water, said presumed particle is generated in a state structured with protons H+ and an electron e− as shown in FIG. 1B following to the release of a hydrogen bond established between said two molecules of water. It is reported that water in which the presumed particles are generated can pass through aquaporin (its diameter is at an order of one in a billion) which structures the cell membranes of a living organism (FIG. 1C). pM shown in FIG. 1C means picometer. Contacting the water in which the presumed particles are generated to the other object, the presumed particles are either transcribed or printed, or transmitted thereto, said object becomes the one bearing the presumed particle. This movement of the presumed particle is herein defined as "transcription". For example, the water in which the presumed particles are generated is stored in a water tank, and an object is immersed in said water tank for a certain period of time, the presumed particles are transcribed to said object itself. In addition, it is also known that the presumed particles are transcribed to the object by just bringing the object closer to the water in which the presumed particles are generated.

By subjecting water to high pressure as described above, hydrogen bonds in the water are released so that the molecules of the water are broken apart to thereby generate the water provided with reducible activity (the water causing reduction) of which oxidation-reduction potential is low. The degree of the water provided with reducible activity has a correlation with the size of water molecules measured with H-NMR (hydrogen-nuclear magnetic resonance spectrometer), and said low oxidation-reduction potential is confirmed with the analysis using H-NMR. Now the process of decline of the oxidation-reduction potentials is further explained below with referring to FIG. 2 and FIG. 3.

Figure 2:
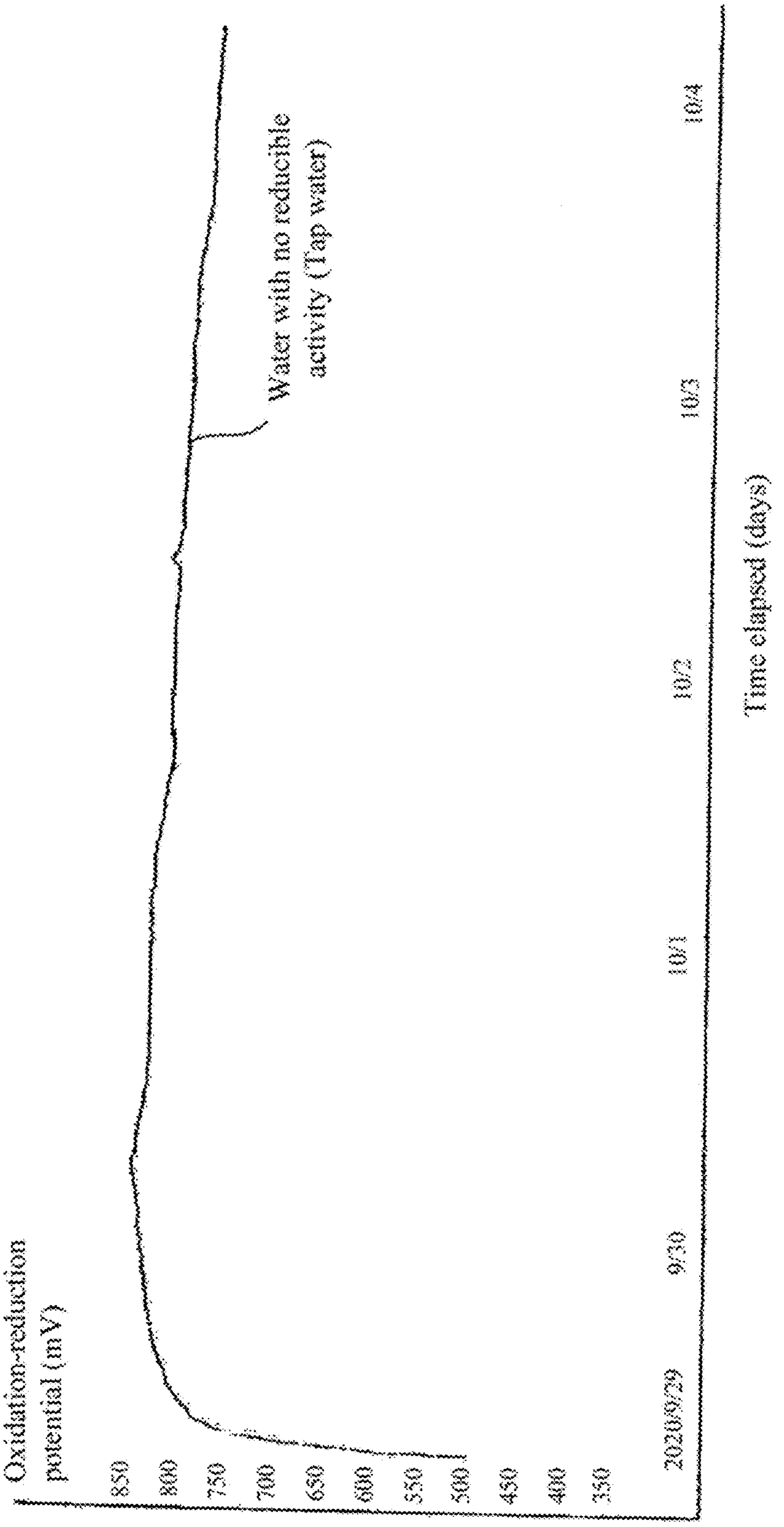
FIG. 2 is a diagram showing the changes in the oxidation-reduction potentials over time (days) when measuring general tap water being water with no reducible activity.
Figure 3:
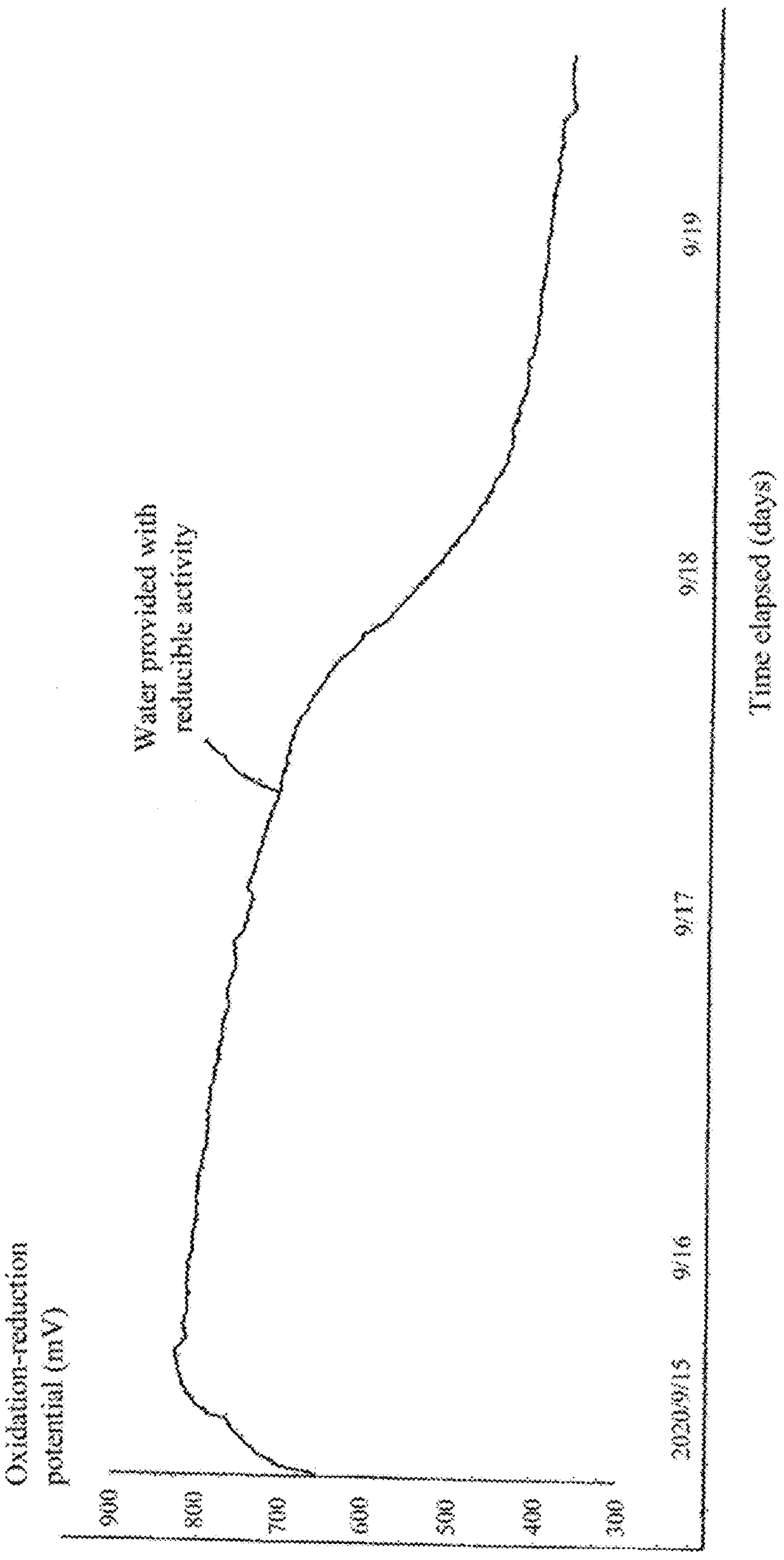
FIG. 3 is a diagram showing the changes in the oxidation-reduction potentials over time (days) when measuring water provided with reducible activity.

FIG. 2 and FIG. 3 shows comparison of general tap water with no reducible activity (FIG. 2) and the water provided with reducible activity (FIG. 3) in respect of the transition of the oxidation-reduction potentials over time. The oxidation-reduction potential is measured by placing the probe of oxidation-reduction potentiometer in the test water filled in a container. In this experiment, the oxidation-reduction potentials of the test water are measured in a state that the probe of the oxidation-reduction potentiometer is placed continuously in the test water for 4 to 5 days. In FIG. 2 and FIG. 3, the horizontal axis denotes the elapsed-time (days) and the vertical axis denotes the measured values (mV) of oxidation-reduction potential. As definitely understood from these data, the potential of the general tap water with no reducible activity is on a slightly downward trend along with the elapsed-time but almost no change observed as a whole as shown in FIG. 2. Besides, in case of the water provided with reducible activity, the potential rises rapidly in the initial stage as shown in FIG. 3, then starts to decline after 30 minutes from the measurement initiation, and further declines sharply from the second day after the start of the measurement, then continuous decline of the potential is observed. In this experiment, the oxidation-reduction potentials of the water provided with reducible activity decline from 820 mV to approximately 380 mV during the whole period of the measurement.

The gist of the present invention is to promote the growth of the agricultural crops, such as grains including rice and wheat, vegetables, ornamental plants, and hydroponic plants, by means of using the water provided with reducible activity obtained by means of transcription of the presumed particles to water, said presumed particles are generated by applying high pressure to water, as water required for cultivation of agricultural crops, to thereby increase the yields of agricultural products.

In the actual rice plant cultivation in paddy fields, there may be difficult to directly fill the fields with the water provided with reducible activity since the cultivation areas for rice plants are so wide and require huge amount of the water provided with reducible activity in order to fill the whole cultivation field therewith. However, for the agricultural crops those which do not require wide cultivation areas, it may be enough possible to supply the water provided with reducible activity to the whole fields and to cultivate those agricultural crops.

Taking such difficulty into consideration that spraying the water provided with reducible activity to the whole area of a wide fields and filling the whole area with the water provided with reducible activity will not be realistic to carry out, the present invention is so constituted that it is possible to make the soil of a cultivated field to be the soil provided with reducible activity by means of applying the power and granular material provided with reducible activity to vegetation fields or paddy fields, then mixing the powder and granular material with the soil in those vegetation fields, etc. to thereby prepare the vegetation soil so as to be the soil provided with reducible activity. The method to provide the powder and granular material with reducible activity is achieved by immersing the powder and granular material to the water, to which high pressure at 147 megapascals is applied for a fixed period of time, or by bringing the powder and granular material closer to the water provided with reducible activity for a fixed period of time.

In addition to the direct dipping of the powder and granular material into the water provided with reducible activity, a method of providing the powder and granular material with reducible activity by means of enclosing the powder and granular material in a bag, such as a permeable bag, and introducing the powder and granular material enclosed in a bag into the water provided with reducible activity can also be adopted. Note that the bag should not be permeable one, and a bag made of any other material, such as nonwoven cloth or synthetic resin, can also be adopted.

As the alternatives for the powder and granular material, fine powdered charcoal or rice husk charcoal obtained by carbonizing rice husks may also be used. Use of the later will be advantageous as it works as effective use of rice husks, since this can be return of rice husks harvested from paddy field to the paddy field again. It should be noted that the powder and granular material provided with reducible activity has to be homogenously mixed as evenly as possible with soil in the cultivated field. As the raw materials of the powder and granular material, powder and granules of a given particle size can be used.

Figure 4A:
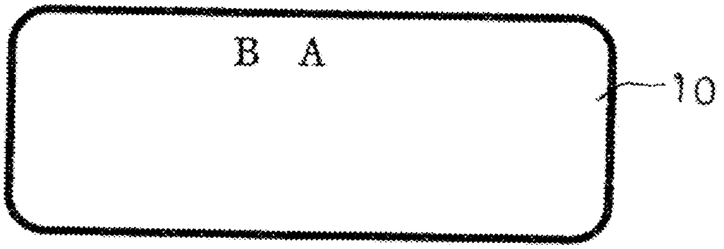
FIGS. 4A and 4B are diagrams showing the sampling positions A and B (FIG. 4A) for rice plants cultivated in an ordinary field to which no reducible activity is provided and the sampling positions 1 through 5 (FIG. 4B) for rice plants cultivated in a field to which rice husk charcoal provided with reducible activity is mixed.
Figure 4B:
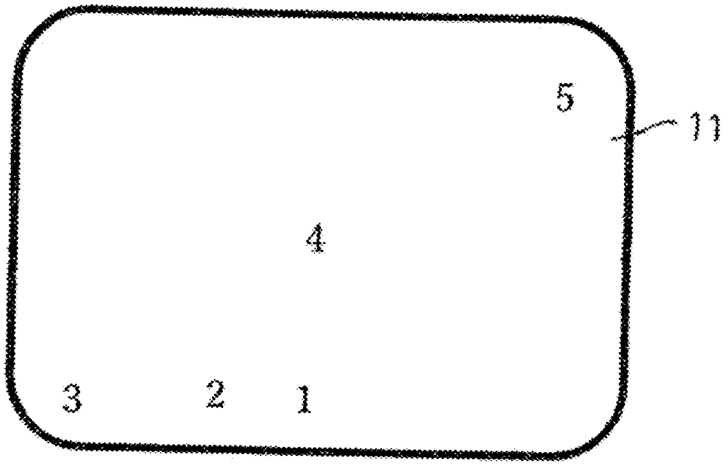

FIG. 4A is a drawing showing the positions for sampling rice plants grown in the field 10 to which no reducible activity is applied, and FIG. 4B is a drawing showing the positions for sampling rice plants grown in the field 11, to which the powder and granular material provided with reducible activity prepared according to the method of this invention, more specifically, the rice husk charcoal provided with reducible activity is applied. In this field experiment, comparison in the growth was made between two rice plants grown at the sampling positions A and B in the field with no reducible activity and collected respectively from those sampling positions and five rice plants grown at the five sampling positions (namely positions denoted with numerals 1 through 5 in the drawing) in the field to which the water provided with reducible activity is applied and collected therefrom. It should be noted that it is required to check the state of tiller of rice plants in order to determine the growth status of rice plants. Tiller is defined as branching from the node of stems closer to the root of rice plant and wheat, and among the tiller of rice plants, the tillering with formation of husks is called herein as "productive tiller". The seven rice plants were air-dried indoors, and the number of the stems with husks (productive tiller) was counted following to the change in the weight of each rice plant is stabilized. As clearly shown in FIG. 5, both of the number of the stems with husks and the weight of the husks obtained from a rice plant, those which are grown in the field provided with reducible activity at the positions denoted with numerals 1, 2, 3, 4, 5 in FIG. 4B, are greater than both of the number and the weight obtained from rice plants grown in the field with no reducible activity at the positions A and B in FIG. 4(*a*).

Now, the present invention is explained with referring to more concrete data shown in FIG. 5. FIG. 5 shows total yields obtained from all stems with husks, number of stems with husks and the weight (g) of husks per rice plant. The number of stems with husks and the weight (g) of husks grown at the position A of FIG. 4A are 20 and 37 g, respectively, and the number of stems with husks and the weight (g) of husks grown at the position B of FIG. 4A are 24 and 44 g, respectively. The averages of the numbers of stems with husks and the weight of husks for the rice plants grown at the positions of A and B are 22 and 40.5 g, respectively. On the other hand, in the field provided with reducible activity according to this invention, the number of stems with husks of the rice plants grown at the positions of numerals 1 through 5 shown in FIG. 4B are 20, 27, 36, 23, and 28, respectively and the weight of the husks are 52 g, 46 g, 86 g, 46 g, and 59 g, respectively as shown in FIG. 5. The average of the numbers of the stems with husks and the average of the weights of husks obtained from the stems with husks both grown at the positions 1 through 5 are 26.8 and 57.8 g, respectively as shown in FIG. 5.

The analysis of the results shown in FIG. 5 indicates that the maximum weight of the husks is 86 g at the position 3 in the field provided with reducible activity (FIG. 4B) and the minimum weight is 37 g at the position A in the field with no reducible activity, and the difference between the above two weights is approximately 2.3 times. And the difference in the averages of the numbers of husks and the weights of the husks between the field with no reducible activity and the field provided with reducible activity are greater than 1.4 times in both cases. Although there is a large variability in the number of stems with husks and the weight of the husks in the field provided with reducible activity, superior results are gained overall in all of the fields provided with reducible activity according to this invention comparing to the fields with no reducible activity. Note that both results of the number of stems with husks and the weight of husks at the position 3 shown in FIG. 4B are superior in particular, it is presumed that such results thanks to the position 3 being closer in distance to drains. If it could make possible to realize the same yields from all fields provided with reducible activity as the yield from the field at the position 3, it will be possible to attain more than double yield in total without paying labors to carry out special workings.

Figures 6A, 6B:
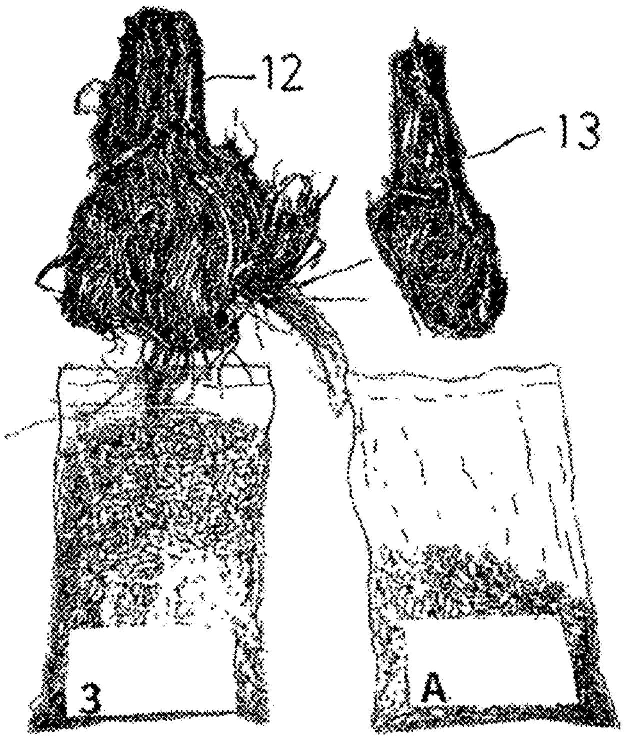
FIGS. 6A and 6B are comparison charts showing a root (a) of a rice plant cultivated with use of water provided with reducible activity and a root (b) of a rice plant cultivated with use of ordinary water.

FIG. 6A and FIG. 6B are images in comparison showing as an example of the root of a rice plant cultivated with use of the water provided with reducible activity (FIG. 6A)) and another example of the root of a rice plant cultivated with use of general water with no reducible activity (FIG. 6B). Note that, in FIGS. 6A and 6B, the root 12 of a rice plant is an example which is cultivated at the position 3 shown in FIG. 4B in the field 11 provided with reducible activity, and the root 13 of a rice plant is another example of the root sampled from the position A shown in FIGS. 4A and 4B in the field 10 provided with no reducible activity (FIG. 4A. It is clearly understood from these images that the root of the rice plant cultivated in the field provided with reducible activity is larger than the root of the rice plant cultivated in general field with no reducible activity and the weight of the former is 3 to 2.5 times heavier than the weight of the later.

Now, demonstration test results regarding the productive tiller and the yields in the experimental field located in the inventor's laboratory are explained with referring to the obtained data. FIG. 7 is a chart comparing data obtained from the experimental field with no reducible activity (FIG. 4A) with data obtained from the field to which the rice husk charcoal provided with reducible activity according to this invention is applied (FIG. 4B)). In this experiment, the number of branched stems with husks, namely the productive tiller is demonstrated. For example, the number of the stems with husks (productive tiller) in the column A of FIG. 7, where the applied quantity of rice husk charcoal is 0.5 kg per square meter, is 18 per one rice plant as to the case of data No. 1. Similarly, the number of the productive tiller at the position A is 21 per one rice plant for the case of data No. 2. Note that the numbers in the column of control of FIG. 7 are comparative results of the numbers of productive tiller for the case of cultivation in the field, to which the quantity of rice husk charcoal provided with reducible activity is zero.

First of all, seeding of rice plants is carried out over the whole area of 486 square meter experimental field, then following to check of the germination, rice plant seedlings are planted to the experimental field. Then, seven plots in a rectangular shape, the area of each plot is 1 m×2 m, are fixed inside the experimental field, and each plot is surrounded with corrugated panels. Then, defined amount of rice husk charcoal provided with reducible activity (kg per square meter) is applied to each of the six plots other than one plot with no reducible activity. After one month from the planting of rice plants, oxidation-reduction potentials are measured with an oxidation-reduction potentiometer for the plots applied with rice husk charcoal. Growth of green algae is recognized in the plot E of FIG. 7, the oxidation-reduction potential of which soil was −530 mV, besides the oxidation-reduction potentials in the soil of the other plots (A, B, C, D, F) do not cause a profound change and are in a range of from 340 to 350 mV. After three months from the planting of rice plants and before the harvest, five rice plants are sampled at random from each of the plots A through F, and the number of productive tiller was counted for each rice plant. The data No. 1 through 5 shown in FIG. 7 indicates the data obtained from each of five rice plants, that is, five data per individual rice plant are shown, respectively.

From the data shown in FIG. 7, it is clearly noted that the number of productive tillers increases in proportion to the applied amount of rice husk charcoal provided with reducible activity.

Now, the yields plot by plot measured in the form of rice plant with husks after threshing each rice plant individually is explained in comparison of the yield from the general field with no reducible activity with the yield from the field applied with rice husk charcoal provided with reducible activity. FIG. 8 shows the yields (g) ploy by plot in the form of rice plant with husks after threshing each rice plant individually in the experiment described above. In this experimental cultivation, rice plants are cultivated in the field with 10 cm depth to which mixture of the rice husk charcoal and soil are filled, and the yields per square meter was measured, respectively. It is clearly noted from FIG. 8 that the yields increase in proportion to the applied amount of the rice husk charcoal provided with reducible activity. From the data shown in FIG. 8, it is also recognizable that the yields from the field to which the rice husk charcoal provided with reducible activity is applied in an amount of 2.5 kg per square meter is more than 50% higher than the yield from the general fields.

Further, the inventors of this invention conducted demonstration test to find the upper limit of the applicable amount of the rice husk charcoal provided with reducible activity. According to this test, the yields tend to increase in all of the plots in response to the gradual increase of the applied amount of said rice husk charcoal provided with reducible activity starting from 2.5 kg per square meter. Although variation was recognized in one plot, no clear upper limit (peak value) was determined from the whole plots. As a result, it is concluded that the yield increases in response to the increase of the applied amount of the rice husk charcoal provided with reducible activity. However, it is not practically realistic to completely fill the field with the rice husk charcoal provided with reducible activity in terms of the expense and supply capacity of the rice husk charcoal, etc., and it is reasonable to set the amount of the rice husk charcoal provided with reducible activity so as to be mixed to the field at a rate of 4 kg per square meter as the upper limit. Note that this application amount is based on the following calculation. If fill the experimental field in a depth of 10 cm and with an area of one square meter, namely the volume of soil equal to 100 liters, with the rice husk charcoal, the required weight of the rice husk charcoal provided with reducible activity is calculated as 12.5 kg. Since it is assumed that one third of the total amount of soil in the field is enough to be replaced with the rice husk charcoal provided with reducible activity for increasing yields, the applied amount thereof is calculated as approximately 4 kg (32 liters), which is considered as the upper limit for practical rice plant cultivation.

From the perspective described above, the required amount of the powder and granule material, for example the rice husk charcoal, provided with reducible activity per square meter of paddy field is considered to be 2 to 4 kg per square meter, preferably 2.5 to 4 kg per square meter.

According to the present invention, since the information of the water provided with reducible activity, namely the presumed particles, is transcribed to the powder and granular material, e.g. rice husk charcoal and soil in the paddy field is reduced with use of the rice husk charcoal provided with reducible activity, it is possible to achieve significant results of increased yields of agricultural products. The rice husk charcoal has been used traditionally for melting snow fast by spreading them onto snow or is used as a soil conditioner for neutralizing soil which has been acidified due to application of chemical fertilizers. However, the yields of agricultural products do not increase by the application of rice husk charcoal as it is to general fields. Contrary to that, as it is clear from the verification as described above, it is made possible to significantly increase the yields of agricultural products by applying the rice husk charcoal provided with reducible activity to the fields.

As explained above, according to the production method for agricultural products of the present invention, yields of agricultural crops (rice and the other agricultural products) obtainable from paddy fields and the other cultivated lands will be increased. Furthermore, according to the production method for the hydroponic plants of the present invention, it is made possible to promote the growth of the hydroponic plants grown either in greenhouses or facilities such as plant factories to thereby increase the yields thereof. As explained above, the powder and granular material for production of agricultural products according to the present invention is useful not only in the implementation of the production method for agricultural products but also in the implementation of the production method for the hydroponic plants.

The invention claimed is:

1. A production method of agricultural products, comprising the steps of:

applying high pressure to water at a level of 147 megapascal to generate the water comprising presumed particles provided with reducible activity;

immersing a powder and granular material, which functions as a treated media for production of agricultural products, in the water comprising the presumed particles provided with the reducible activity, thereby preparing the powder and granular material provided with the reducible activity; and cultivating agricultural crop in a field where the powder and granular material provided with the reducible activity is mixed with a vegetation soil in the field.

2. The production method of agricultural products according to claim 1, characterized in that the powder and granular material provided with reducible activity is prepared by means of immersing untreated powder and granular material enclosed in a bag in the water wherein the presumed particles are generated.

3. The production method of agricultural products according to claim 1, characterized in that the powder and granular material is either crushed coal or rice husk charcoal prepared by carbonizing rice husks.

4. The production method according to claim 1, characterized in that the amount of the powder and granular material provided with reducible activity to be applied to the vegetation soil is fixed to a range of from 2.5 to 4.0 kg per square meter of paddy field.

* * * * *